US012011805B2

United States Patent
Wilson et al.

(10) Patent No.: US 12,011,805 B2
(45) Date of Patent: Jun. 18, 2024

(54) SYSTEM AND METHOD OF CLEANING A HEAT EXCHANGER

(71) Applicant: CANDU ENERGY INC., Mississauga (CA)

(72) Inventors: Paul Wilson, Burlington (CA); Peter Visser, Misissauga (CA); Brent Spivak, Mississauga (CA)

(73) Assignee: CANDU ENERGY INC., Mississauga (CA)

( * ) Notice: Subject to any disclaimer, the term of this patent is extended or adjusted under 35 U.S.C. 154(b) by 752 days.

(21) Appl. No.: 16/464,597

(22) PCT Filed: Nov. 24, 2017

(86) PCT No.: PCT/CA2017/000249
§ 371 (c)(1),
(2) Date: May 28, 2019

(87) PCT Pub. No.: WO2018/098556
PCT Pub. Date: Jun. 7, 2018

(65) Prior Publication Data
US 2020/0156212 A1 May 21, 2020

Related U.S. Application Data

(60) Provisional application No. 62/426,920, filed on Nov. 28, 2016.

(51) Int. Cl.
*B24C 3/32* (2006.01)
*B08B 9/023* (2006.01)
(Continued)

(52) U.S. Cl.
CPC .............. *B24C 3/325* (2013.01); *B08B 9/023* (2013.01); *B08B 9/032* (2013.01); *B24C 1/00* (2013.01);
(Continued)

(58) Field of Classification Search
CPC ... F28G 1/16; F28G 1/163; F28G 9/00; F28G 15/003; F28G 15/04; B24C 3/325; B08B 9/032; B08B 3/14; B08B 9/027
See application file for complete search history.

(56) References Cited

U.S. PATENT DOCUMENTS 3,933,519 A * 1/1976 Koch ...................... B08B 9/023
137/15.01
4,256,511 A * 3/1981 Atchison ................. F28G 9/005
134/171

(Continued)

FOREIGN PATENT DOCUMENTS

CA        2941210 A1    10/2015
CN      102644487 A      8/2012
(Continued)

OTHER PUBLICATIONS

Chinese Office Action issued in Chinese Application No. 2017800729390 dated May 27, 2020.
(Continued)

*Primary Examiner* — Jenna M Hopkins
(74) *Attorney, Agent, or Firm* — NORTON ROSE FULBRIGHT CANADA LLP

(57) ABSTRACT

Methods and systems for cleaning inner surfaces of tubes in a heat exchanger. Some systems include a cleaning device having a nozzle configured to inject cleaning fluid into first and second tubes to perform different first and second cleaning cycles on the tubes, respectively, a controller configured to determine delivery parameters for the cleaning cycles based on a characteristic of each tube, and to control the cleaning device to perform the cleaning cycles based on the delivery parameters. Some methods include determining, with a controller, a tube in the heat exchanger engaged with a nozzle of a cleaning device for injecting a cleaning fluid into the tube during a cleaning cycle, a characteristic of
(Continued)

the tube, and a delivery parameter of the cleaning cycle for the tube based on the characteristic of the tube; and performing the cleaning cycle for the tube based on the delivery parameter.

17 Claims, 12 Drawing Sheets

(51) Int. Cl.
| | |
|---|---|
| B08B 9/032 | (2006.01) |
| B24C 1/00 | (2006.01) |
| B24C 7/00 | (2006.01) |
| F28G 1/16 | (2006.01) |
| F28G 9/00 | (2006.01) |
| F28G 15/00 | (2006.01) |
| F28G 15/04 | (2006.01) |

(52) U.S. Cl.
CPC .................. *B24C 7/00* (2013.01); *F28G 1/16* (2013.01); *F28G 1/163* (2013.01); *F28G 9/00* (2013.01); *F28G 15/003* (2013.01); *F28G 15/04* (2013.01)

(56) References Cited

U.S. PATENT DOCUMENTS

| | | | | |
|---|---|---|---|---|
| 4,297,147 | A * | 10/1981 | Nunciato | C10G 9/16 134/8 |
| 4,351,387 | A * | 9/1982 | Milia | F28G 1/12 165/95 |
| 4,572,744 | A * | 2/1986 | Dominick | B08B 9/0558 134/22.12 |
| 5,336,331 | A * | 8/1994 | Jenkins | F28G 15/04 165/95 |
| 5,499,639 | A * | 3/1996 | Williams, Jr. | F28G 9/00 134/22.12 |
| 5,680,665 | A * | 10/1997 | Anson | B08B 9/057 165/95 |
| 6,308,774 | B1 * | 10/2001 | Kramer | G21F 9/004 165/95 |
| 6,681,839 | B1 * | 1/2004 | Balzer | F28G 15/04 165/95 |
| 7,043,373 | B2 * | 5/2006 | Pittalwala | F17D 5/00 702/34 |
| 7,789,966 | B2 * | 9/2010 | Kramer | F28G 1/163 451/36 |
| 7,900,691 | B2 * | 3/2011 | Kragt | F28G 1/12 165/95 |
| 8,048,234 | B2 * | 11/2011 | Jacquinet | B08B 9/0495 134/22.12 |
| 8,181,693 | B2 * | 5/2012 | Park | F28G 1/12 165/95 |
| 9,034,110 | B2 * | 5/2015 | Johns | F28G 1/12 134/22.18 |
| 9,157,685 | B2 * | 10/2015 | Dixon | F28G 1/02 |
| 9,724,737 | B2 * | 8/2017 | Thomas | B08B 9/043 |
| 9,897,401 | B2 * | 2/2018 | Suchard | C11D 11/0041 |
| 10,024,612 | B2 * | 7/2018 | AlSadah | A46B 13/02 |
| 11,110,566 | B2 * | 9/2021 | Curran | F28G 1/12 |
| 2004/0035445 | A1 * | 2/2004 | Saxon | B08B 9/0321 134/8 |
| 2009/0217888 | A1 * | 9/2009 | Frach | F23J 3/023 122/379 |
| 2009/0255557 | A1 * | 10/2009 | Gardner | F28G 15/02 701/25 |
| 2013/0233350 | A1 * | 9/2013 | Tomkins | B08B 3/14 134/109 |
| 2014/0251383 | A1 * | 9/2014 | Lyle | F28G 15/003 134/22.12 |
| 2017/0022460 | A1 * | 1/2017 | Suchard | C11D 7/06 |
| 2019/0178593 | A1 * | 6/2019 | Boye | B08B 5/02 |
| 2020/0156212 | A1 * | 5/2020 | Wilson | F28G 15/003 |

FOREIGN PATENT DOCUMENTS

| | | | | |
|---|---|---|---|---|
| CN | 105928415 A | | 9/2016 | |
| DE | 336618 C | | 5/1921 | |
| EP | 1391680 A1 | | 2/2004 | |
| FR | 2904940 A1 | | 2/2008 | |
| GB | 1025489 A | * | 4/1966 | |
| GB | 2467942 A | * | 8/2010 | ........... B08B 9/0323 |
| GB | 2491143 A | * | 11/2012 | ........... B08B 9/0322 |
| WO | 2014087045 A1 | | 6/2014 | |

OTHER PUBLICATIONS

Extended European Search Report issued in European Application No. EP 17877110, dated Oct. 30, 2020.
International Search Report and Written Opinion on the corresponding International Application No. PCT/CA2017/000249, dated Feb. 1, 2018.
European Patent Office, Office Action dated Nov. 5, 2021 for European Patent Application No. 17877110.1.
Canadian Intellectual Property Office, Office Action dated Jun. 14, 2023 in corresponding Canadian Patent Application No. 3,045,162.
Korean Intellectual Property Office (KIPO), Office Action dated Apr. 5, 2022 for Korean Patent Application No. 10-209-7018859.

\* cited by examiner

AFTER

BEFORE

SYSTEM AND METHOD OF CLEANING A HEAT EXCHANGER

CROSS-REFERENCE TO RELATED APPLICATIONS

This application claims priority to U.S. provisional patent application No. 62/426,920 filed on Nov. 28, 2016, the entire contents of which are incorporated herein by reference.

FIELD

Embodiments described herein relate to systems and methods of cleaning tubes in a heat exchanger and, in particular, cleaning inner surfaces of tubes in a heat exchanger.

BACKGROUND

Heat exchangers are used in a variety of devices to transfer heat from one medium to another. By way of example only, heat exchangers may be found in heating systems, air conditioners, refrigerators, natural gas processing systems, sewage treatment systems, and steam generators. Heat exchangers often have one or more tubes through which fluid flows. The tubes may be straight, U-shaped, or have any other shape enabling fluid flow therethrough. In some embodiments, heat exchangers transfer heat between different fluids (e.g., gasses and/or liquids) by allowing heat to pass between a fluid flowing through the tubes of the heat exchanger and a fluid circulating around the tubes.

After continued use, debris may collect on inner surfaces of the tubes of a heat exchanger. The build-up may cause a decrease in heat transfer efficiency and flow rate of fluid through the heat exchanger. However, this debris is often difficult to clean, and may require the heat exchanger to be out of commission (i.e., non-operational) during the cleaning process. Accordingly, systems and methods for cleaning heat exchanger tubes with improved speed, efficiency, and/or effectiveness continue to be welcome additions to the art.

SUMMARY

Embodiments described herein provide methods and systems for cleaning inner surfaces of tubes of a heat exchanger. According to some embodiments, the cleaning system includes a movable cleaning device having a cleaning head configured to supply a cleaning fluid (for example, a solution including pressurized gas and blasting media) into a tube to perform a cleaning cycle, and an electronic controller. The controller is configured to execute instructions to automatically adjust a delivery parameter of the cleaning cycle based at least in part upon at least one characteristic of the tube. Characteristics of the tube may include one or more of the following features: a material composition of the tube, a diameter of the tube, a thickness of the wall of the tube, a radius of curvature of a bend in the tube, and a position of the tube within the heat exchanger. The delivery parameter may include one or more of the following: an amount of blasting media (e.g., flow rate of blasting media, the ratio of blasting media to gas or liquid of the cleaning fluid), a pressure of compressed gas or liquid, a velocity of compressed gas or liquid, a velocity of blasting media through the tube, a type of blasting media or gas used, and a duration of time the tube is cleaned (for example, the duration of time the fluid is injected into the tube).

Another embodiment provides a method of cleaning a tube of a heat exchanger. The method includes determining, with a controller, a tube in the heat exchanger where a cleaning head of a cleaning device is positioned, and determining, with the controller, a characteristic of the tube. The method further includes determining, with the controller, a delivery parameter of a cleaning cycle based at least in part upon the determined characteristic of the tube, and controlling the cleaning device to perform a cleaning cycle using the determined delivery parameter. In some embodiments, the cleaning cycle includes injecting a cleaning fluid, such as a solution or suspension, into the tube of the heat exchanger with the cleaning device, wherein the cleaning fluid includes compressed gas and blasting media. According to some embodiments, determining a characteristic of the tube includes determining at least one of: a material composition of the tube, a diameter of the tube, a thickness of the wall of the tube, a radius of curvature of a bend in the tube, and a position of the tube within the heat exchanger. Furthermore, in some embodiments, determining a delivery parameter of a cleaning cycle includes determining at least one of: an amount of blasting media (e.g., flow rate of blasting media, the ratio of blasting media to gas or liquid of the cleaning fluid), a pressure of compressed gas or liquid, a velocity of compressed gas or liquid, a velocity of blasting media through the tube, a type of blasting media or gas used, and a duration of time the tube is cleaned.

In still other embodiments, a system is provided for cleaning an inner surface of a plurality of tubes included in a heat exchanger. The system includes a motorized tool movable by at least one motor along at least one dimension of a tubesheet containing an end of each of the plurality of tubes and/or along at least one dimension of the plurality of tubes, and operable to deliver a cleaning fluid from the tool into at least one of the tubes. In addition, the system includes a controller automatically adjusting a pressure of the cleaning fluid based at least in part upon a current position of the motorized tool with respect to the tubesheet and/or with respect to at least one tube.

Other aspects will become apparent by consideration of the detailed description and accompanying drawings.

DETAILED DESCRIPTION

Figure 1:
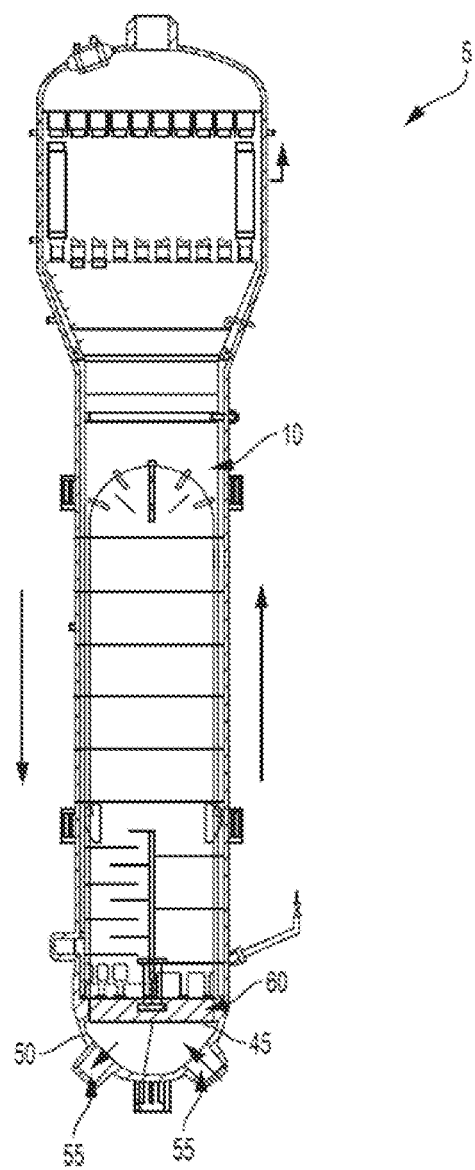
FIG. 1 illustrates a steam generator including a heat exchanger according to some embodiments.

Before any embodiments are explained in detail, it is to be understood that the embodiments described herein are not limited in application to the details of construction and the arrangement of components set forth in the following description or illustrated in the accompanying drawings, and may be practiced or carried out in various ways. Also, it is to be understood that the phraseology and terminology used herein is for the purpose of description only, and should not be regarded as limited. The use of "including," "comprising" or "having" and variations thereof herein is meant to encompass the items listed thereafter and equivalents thereof, as well as additional items. The terms "mounted," "connected" and "coupled" are used broadly, and encompass both direct and indirect mounting, connecting and coupling unless otherwise specified. Further, "connected" and "coupled" are not restricted to physical or mechanical connections or couplings unless otherwise specified, and may include electrical connections or couplings, whether direct or indirect. Also, electronic communications and notifications may be performed using any known manners, devices, and systems, including direct or indirect connections, wireless connections, and the like.

It should be noted that a plurality of hardware and software based devices, as well as a plurality of different structural components may be utilized to implement embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments described herein may be implemented in software (for example, stored on non-transitory computer-readable medium) executable by one or more processors. As such, it should be noted that a plurality of hardware and software based devices, as well as a plurality of different structural components, may be utilized to implement the described embodiments. For example, "controller" and "control unit" described in the specification may include one or more electronic processors, one or more memory modules including non-transitory computer-readable medium, one or more input/output interfaces, and various connections (for example, a system bus) connecting the components.

In many heat exchangers having tubes that transport fluid during heat exchanger operation, a layer of material forms on inner surfaces of the tubes. By way of example only, in heat steam generators and pre-heaters used in nuclear power plants, an oxide layer (sometimes referred to as magnetite corrosion) from carbon steam components in the primary heat transport system forms on the inner surfaces of the steam generator tubes during operation. The oxide layer in such cases typically consists mostly of eroded material, dissolved material (such as iron), or a combination thereof originating from hot piping of a primary heat transport system. This material may collect in cold locations in the heat transport system because the solubility of iron decreases with decreasing temperature. However, other layers of material can accumulate within tube in other locations of a heat transport system. Oxide and other types of material deposits in tubes of a heat exchanger typically have several undesirable effects on the operation of the heat exchanger, including a decrease in heat transfer efficiency and fluid flow (whether coolant or fluid to be cooled is transported through the tubes). In the case of heat exchangers used in power plants, the power plant may be de-rated if such deposits are not removed.

Accordingly, embodiments described herein provide systems and methods of cleaning the inner surfaces of tubes included in heat exchangers. Although the systems and methods are described herein with respect to a nuclear steam generator, the systems and methods may be used to clean the inner surfaces of tubes of other types of heat exchangers.

Figure 2:
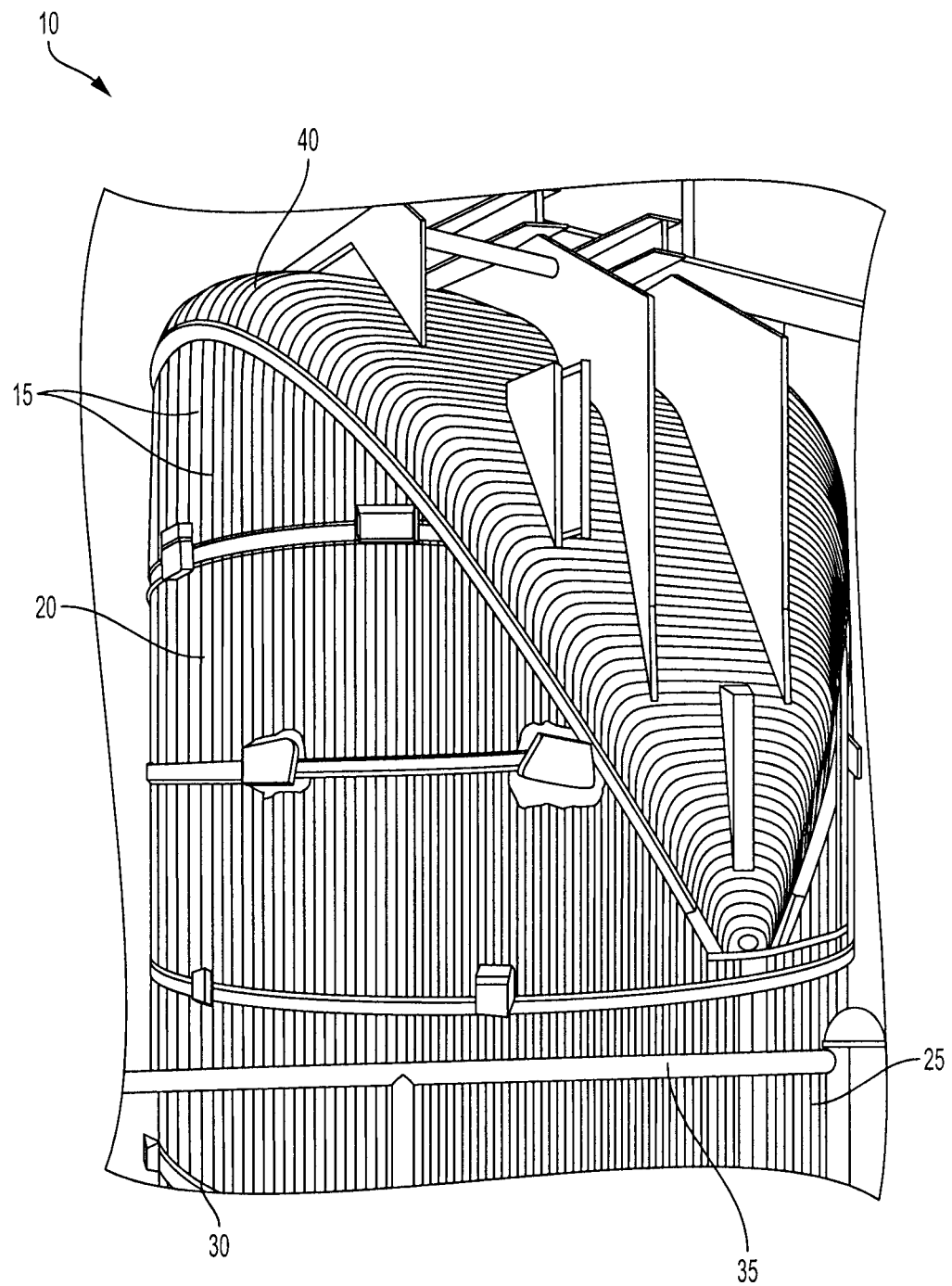
FIG. 2 illustrates a heat exchanger according to some embodiments.

FIGS. 1-2 illustrate a steam generator 5 that includes a heat exchanger 10 having a plurality of tubes 15. In the illustrated embodiment, the tubes 15 are bundled together and arranged into a cylindrical shape. Also with reference to the illustrated embodiment, the tubes 15 are U-shaped (upside down U-shape as shown FIG. 2), such that each tube 15 has a first side 20, a second side 25, and a bend 40 (or curve) between the first side 20 and the second side 25. The first side 20 of the U-shape forms an inlet end 30 of a tube 15, and the second side 25 forms an outlet end 35 of the tube 15. The bend 40 of a tube 15 may have a different radius of curvature than other tubes 15 of the heat exchanger 10. For example, some tubes 15 may have a tighter bend 40, and some tubes 15 may have a wider bend 40. It should be understood that the configuration of the tubes 15 illustrated in FIGS. 1 and 2 is provided as one example, and, in other embodiments, the tubes 15 may be arranged in a different configuration and may have different shapes and curves. For example, the heat exchanger 10 may include tubes 15 that include multiple bends or tubes 15 that spiral into a coiled shape. As other examples, the tubes 15 can be (or include) tubes without bends, in which case at least some of the tubes simply direct fluid from one end of the heat exchanger 10 through to another end.

Figure 3:
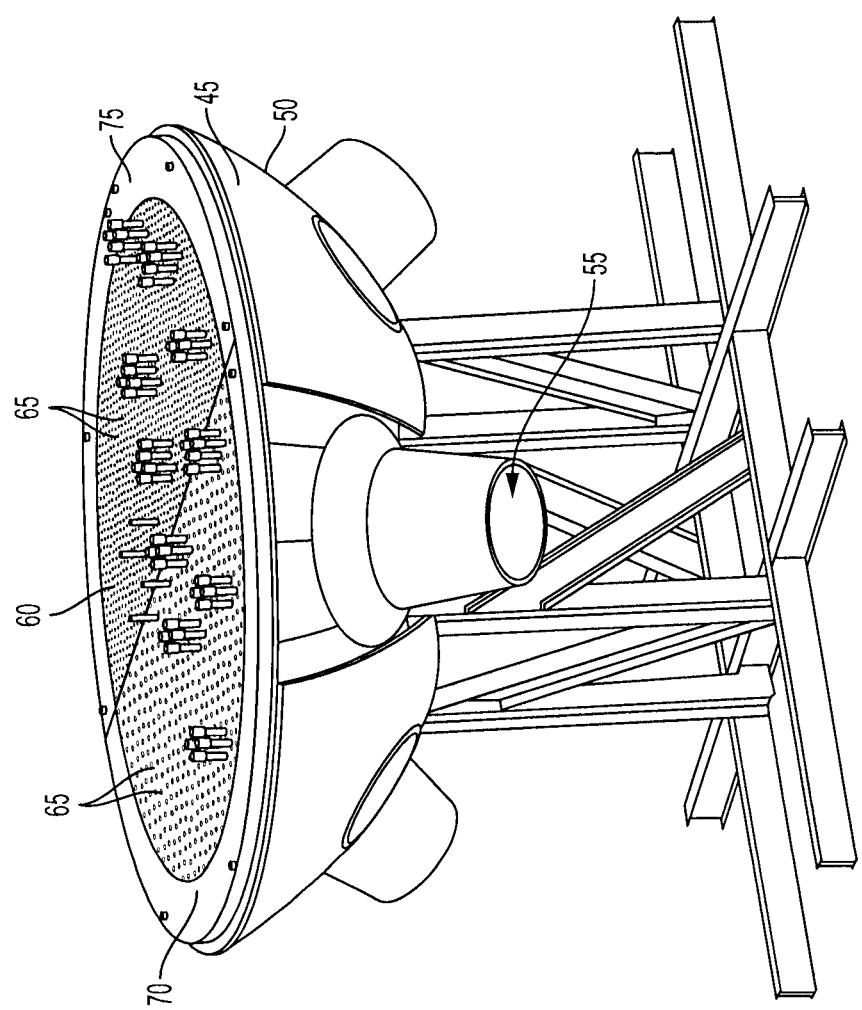
FIG. 3 illustrates a bottom portion of the heat exchanger in FIG. 1 according to some embodiments.

As shown in FIG. 3, the illustrated heat exchanger 10 includes a bottom portion 45 defined by a partially-spherical wall 50. The illustrated bottom portion 45 is hollow and is disposed below the ends 30, 35 of the tubes 15. Cylindrical members extend from the bottom portion 45, each defining a port 55 leading into the hollow bottom portion 45. Each port 55 therefore provides an entrance into the bottom portion 45 of the heat exchanger 10 below the tubes 15. With continued reference to the illustrated embodiment, a tubesheet 60 extends across the bottom portion 45, and includes a plurality of apertures 65 each aligned with a respective end 30, 35 of a tube 15 of the heat exchanger 10. In particular, in the illustrated embodiment, a first portion 70 of the tubesheet 60 includes apertures 65 aligned with the inlet ends 30 of the tubes 15 and a second portion 75 of the tubesheet 60 includes apertures 65 aligned with the outlet ends 35 of the tubes 15. In other embodiments, other structures can be coupled to the ends of 30 and/or 35 of the tubes 15 to perform one or more of the functions of the tubesheet (e.g., establishing a seal around each of the tube ends 30, 35 to define a fluid-tight compartment on either or both sides of the tube ends 30, 35, to secure the tubes 15 in place with respect to one another and surrounding structure, and the like).

Figure 4:
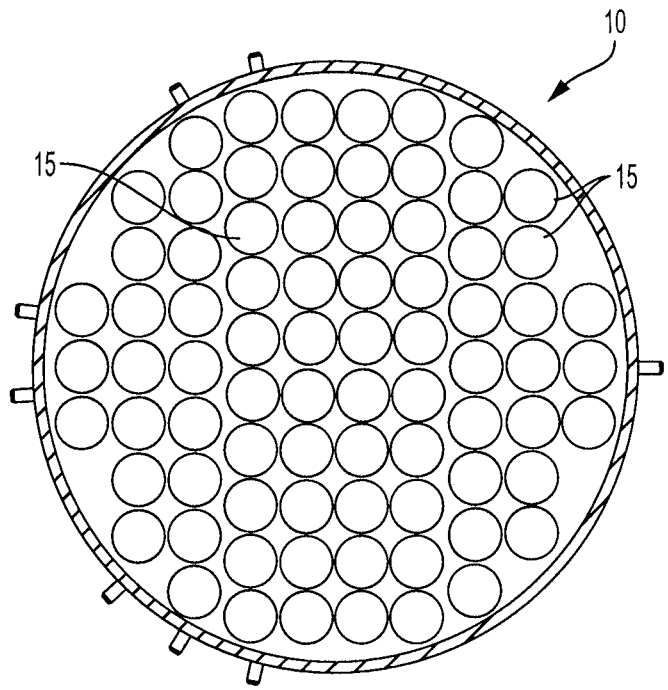
FIGS. 4 and 5 schematically illustrate cross-sections of a heat exchanger having a plurality of tubes according to some embodiments.
Figure 5:
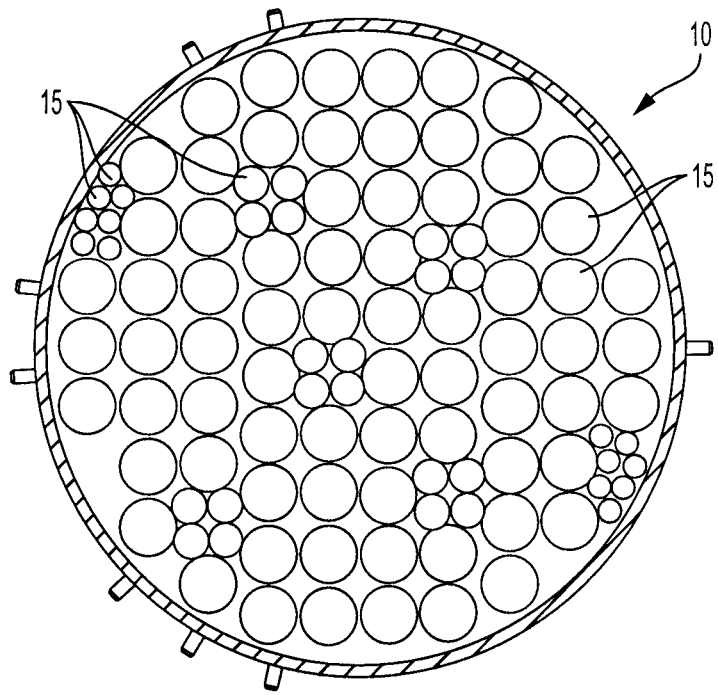

FIGS. 4-5 schematically illustrate a cross-section of the tubes 15 according to alternative embodiments. In the embodiment shown in FIG. 4, the tubes 15 have a uniform diameter. However, in the embodiment shown in FIG. 5 the tubes 15 have varying diameters. Although not drawn to scale in the figures, the cross-section of the tubes 15 in the illustrated embodiments aligns with the apertures 65 in the tubesheet 60 as described above.

Figure 6:
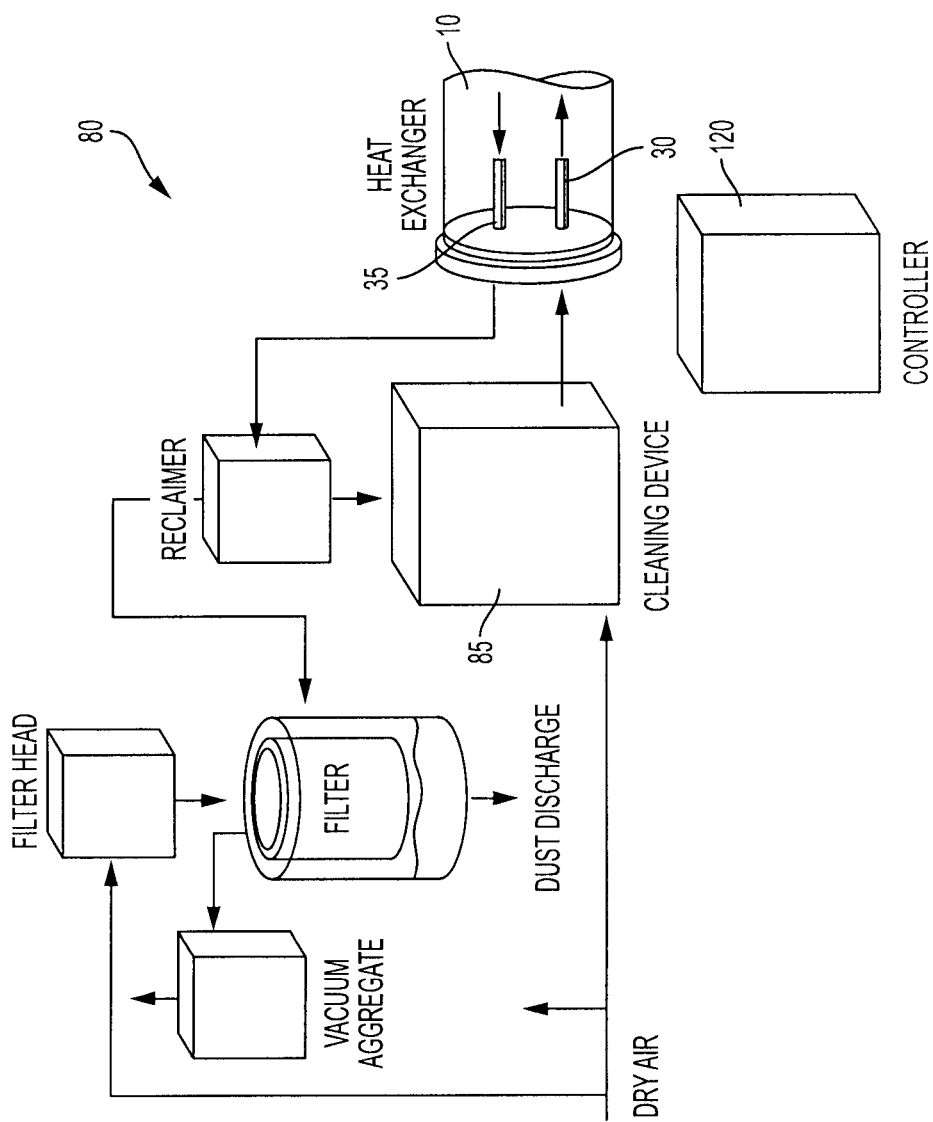
FIG. 6 schematically illustrates a system for cleaning a heat exchanger according to some embodiments.

As described above, over time, debris builds up on the inner surfaces of the tubes 15 over time, and reduces the effectiveness of the heat exchanger 10. FIG. 6 schematically illustrates a system 80 (also referred to as the "cleaning system 80") for cleaning the tubes 15 of the heat exchanger 10 according to some embodiments. The cleaning system 80 blasts the inner surfaces of the tubes 15 with cleaning fluid, which in some embodiments includes a mixture of compressed gas (for example, air) and blasting media. In some embodiments, the cleaning fluid is used in a closed loop process in which the blasting media is injected into the tubes 15 via gas under pressure, is collected as the media exits the tubes 15, and is filtered for reuse. The cleaning system 80 may use any combination of compressed gas or liquid, and blasting material. For example, projectiles such as shot, glass particles, ball bearings, steel spheres, and the like, may be used as the blasting media. Likewise, the carrier fluid can be any suitable gas or liquid for transporting the blasting media through the tubes 15 of the heat exchanger 10, and in some embodiments can carry the blasting media in a suspension or colloid.

Figure 7:
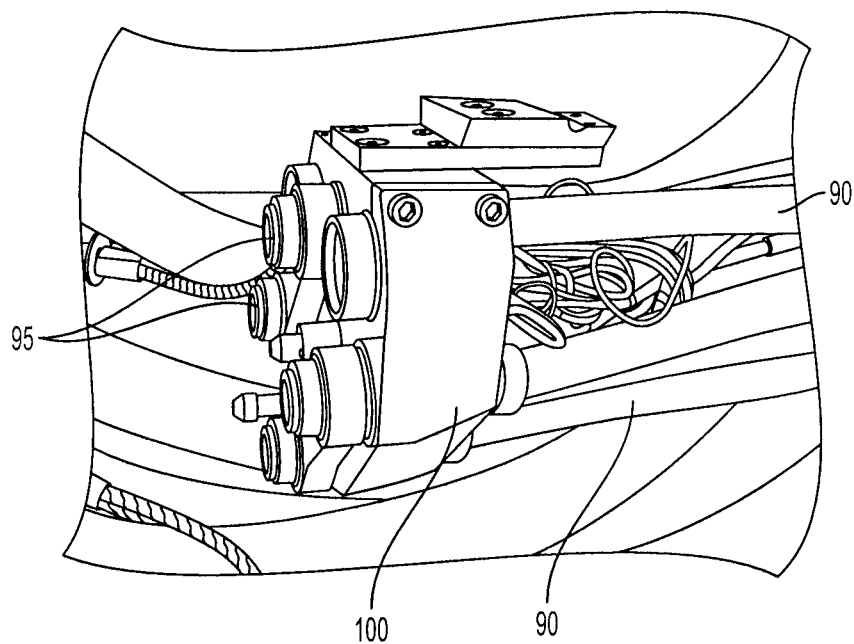
FIG. 7 illustrates a portion of a cleaning device including a delivery line and a tool head supporting a plurality of nozzles according to some embodiments.
Figure 8:
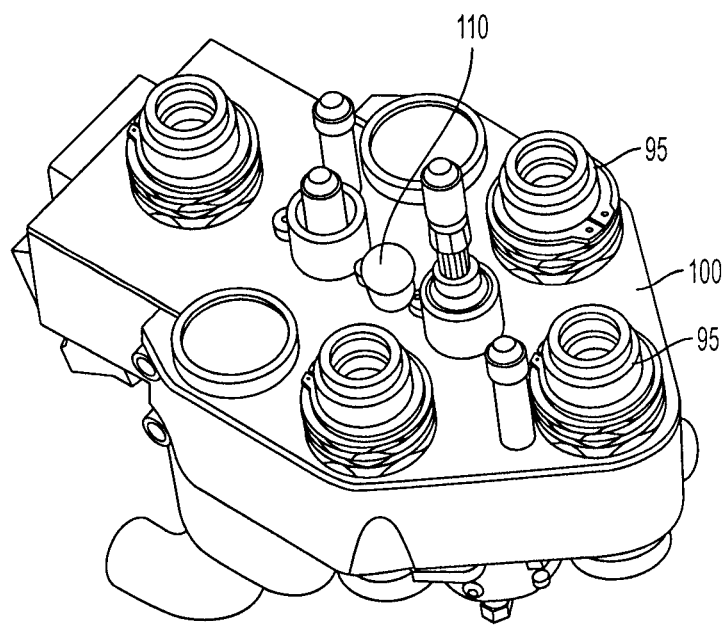
FIG. 8 illustrates the tool head and the plurality of nozzles of FIG. 7.

In some embodiments the cleaning system 80 includes a cleaning device 85 (a blasting unit) having a compressor (not shown) that compresses gas and delivers pressurized gas and blasting media to the inlet ends 30 of the tubes 15. The cleaning device 85 includes one or more delivery lines 90 (blast lines) that receive pressurized air from the compressor. As shown in FIGS. 7-8, the delivery lines 90 of the illustrated embodiment are coupled to nozzles 95 (one delivery line 90 for each nozzle 95) that deliver the compressed gas and blasting media to the tubes 15. The nozzles 95 each define a port of the cleaning device 85 through which cleaning fluid passes to the tubes 15, although it will be appreciated that in other embodiments the port(s) of the cleaning device 85 can be defined by other structure, including apertures of the tool head 100 (described above). In some embodiments, the cleaning device 85 also includes one or more variable-position valves (controlled by one or more actuators) that regulate cleaning fluid flowing through the delivery lines 90 (i.e., for control of pressure and/or flow rate of cleaning fluid exiting the nozzles 95). The cleaning device 85 may include a separate variable-position valve for each delivery line 90 or for a set of delivery lines 90.

In the illustrated embodiment, the nozzles 95 are supported on a tool head 100. The tool head 100 may have one or more nozzles 95 that engage with one or more inlet ends 30 of corresponding tubes 15. In the illustrated embodiment, the tool head 100 includes four nozzles 95. However, greater or fewer nozzles 95 may be supported on each tool head 100. Each nozzle 95 is configured to engage with the inlet end 30 of a respective tube 15 to be cleaned.

Figure 9:
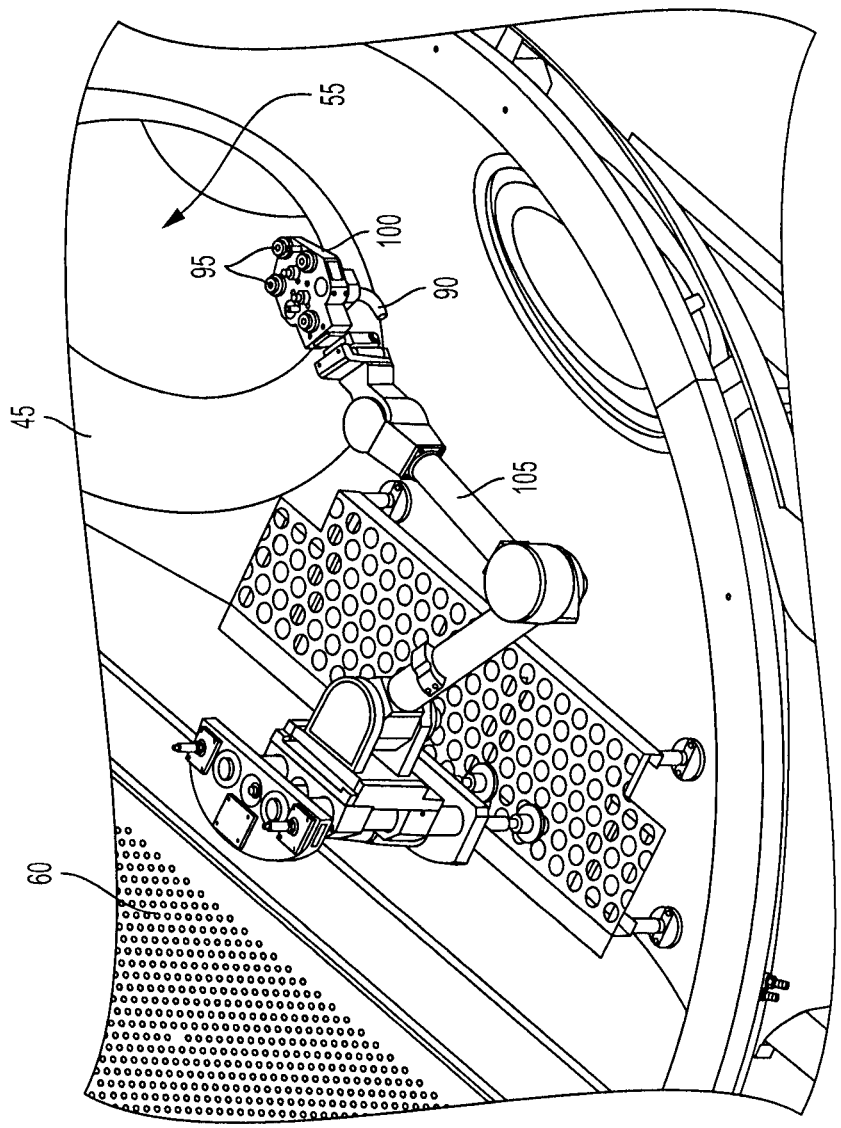
FIG. 9 is a top view of a portion of a cleaning device including a manipulator for controlling movement of the tool head and nozzles of FIGS. 7 and 8.
Figure 10:
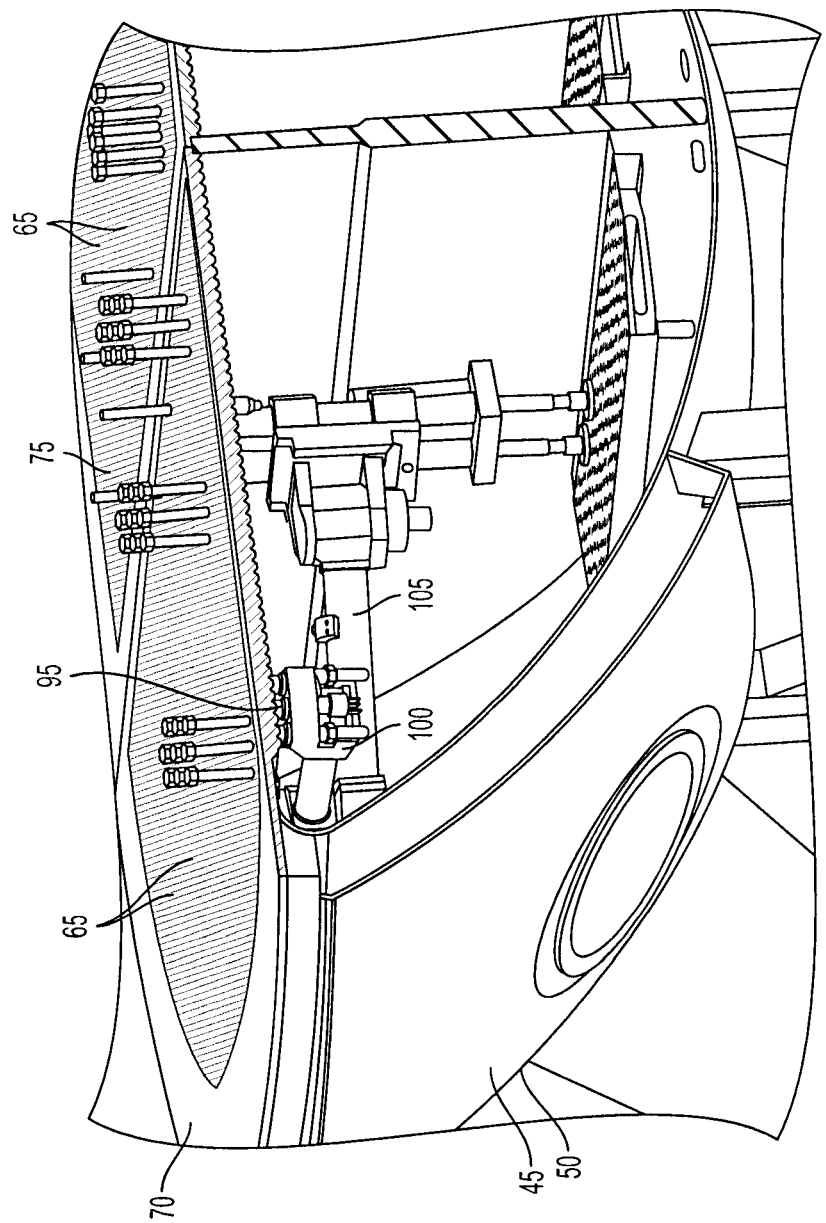
FIG. 10 is a side view of the portion of the cleaning device of FIG. 9.

Referring to FIGS. 9-10 of the illustrated embodiment, a motorized tool (referred to herein as an arm 105) holds the tool head 100 against the inlet ends 30 of tubes 15 to deliver the cleaning fluid to the tubes 15. In the illustrated embodiment, the arm 105 and the nozzles 95 are positioned within the hollow bottom portion 45 of the heat exchanger 10 below the inlet ends 30 of the tubes 15. The arm 105 is configured to move the tool head 100 to align each nozzle 95 with inlet ends 30 of one or more tubes 15. Specifically, the arm 105 moves the tool head 100 to align the nozzles 95 with a first set of one or more tubes 15. Once aligned, a cleaning cycle is performed to clean the inner surfaces of the first set of one or more tubes 15. After the cleaning cycle is complete, the arm 105 moves the tool head 100 to align the nozzles 95 with a second set of one or more tubes 15 to perform the cleaning cycle for the second set of one or more tubes 15. This process may be repeated until all a cleaning cycle has been performed for all of the desired tubes 15 of the heat exchanger.

Figure 11B:
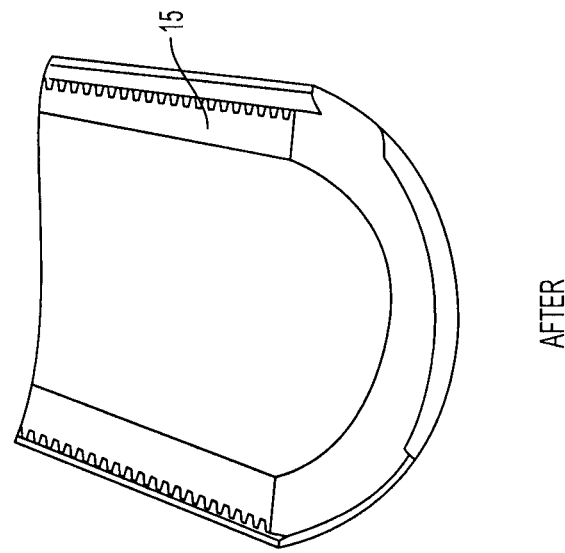
FIG. 11B illustrates the tube of FIG. 11A following cleaning operations on the tube, with debris removed from the inner surface of the tube by the cleaning operations.
Figure 11A:
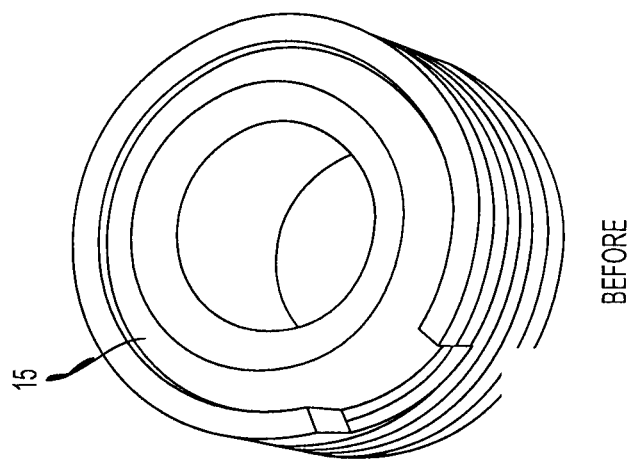
FIG. 11A illustrates an example tube of a heat exchanger with debris built up on an inner surface of the tube prior to cleaning.

As the cleaning fluid (i.e., the combination of gas and blasting media in the illustrated embodiment) travels through the tubes 15 of the heat exchanger 10, the cleaning fluid breaks away deposits on the inner surfaces of the tube 15. In the illustrated embodiment, for example, blasting media in the form of shot carried by pressurized air from the nozzles enters the tube 15, impacts and breaks away deposits on the inner surfaces of the tube 15, and carries the deposits to and out of an opposite end of the tube 15. FIGS. 11A and 11B illustrate one example of a tube 15 before and after cleaning in this manner, respectively.

Referring back to FIG. 6, the blasting media may be collected, filtered, and reused. For example, after passing through and out of a tube 15 being cleaned, the blasting media and any loosened debris exits the tube 15 through the outlet end 35 of the tube 15, and is collected by another tool head on another arm (not shown). Although any suitable device can be used to collect the blasting media and any loosened debris (e.g., a hood, dust collector, and the like) in the illustrated embodiment a second tool head and a second arm are used. The second tool head and second arm have the same structure and operate in the same manner as the tool head 100 and arm 105 described above, but are located on the opposite (outlet) ends 35 of the tubes 15 being cleaned in order to receive the cleaning fluid moving through the tubes 15. More specifically, the second tool head includes a second set of nozzles engaged with the outlet ends 35 of one or more tubes 15. The second set of nozzles of the collection tool head are connected to one or more suction lines, and are held against the outlet ends 35 of one or more tubes 15 by the second arm. The blasting media and debris collected at the outlet ends 35 of the tubes 15 can be collected within a reclaimer (see FIG. 6), with a filter unit separating the blasting media from the collected debris. The filtered blasting media can then be reused. However, in some embodiments, a portion of the blasting media is reused and a portion of the blasting media is disposed of, or all of the blasting media is disposed of. For example, in power plant operations, some blasting media may be recycled back into the tubes 15, while the waste material (loosened debris) and contaminated blasting media can be disposed of.

When cleaning the inner surfaces of a tube 15 with blasting media, the blasting media may concurrently remove tube material from the inner surface of the tube. For example, delivering the blasting media into a tube 15 may remove of a portion of the inner surface of the tube 15, causing the tube 15 to be thinner at certain points. Likewise, delivering the blasting media through the tube 15 at a high velocity or pressure may have a similar effect. Also, some tubes 15 included in a heat exchanger 10 may have characteristics that allow the tubes to withstand a more aggressive cleaning process than other tubes 15 of the same heat exchanger 10. For example, tubes 15 of a heat exchanger 10 may have different material compositions, wall thicknesses, tube diameters, or tube bend radii that impact the effect of different cleaning parameters on each tube, and that can increase or decrease the opportunity for blasting media to etch or otherwise remove tube material during the cleaning process. For example, a tube 15 with a smaller radius of curvature and/or thinner walls may experience greater impact from the same delivery of blasting media than a tube 15 with a greater radius of curvature and thicker walls.

Conventional cleaning systems and methods employ cleaning methods that are blind to such differences between tubes. In such systems and methods, cleaning parameters are selected based upon the tube(s) 15 that are the most susceptible to damage from the cleaning process. For example, a pressure is selected for injecting the cleaning fluid that is the maximum pressure the most susceptible tube 15 can withstand. The cleaning system is then designed to include a valve that, when open, provides the cleaning fluid at no more than the selected pressure. Alternatively, the cleaning system can be designed to limit the length of cleaning time for any given tube to a maximum time that a tube most susceptible to damage from cleaning can withstand. While such configurations can limit tube damage, they have undesirable effects or limitations. For example, even when the majority of the tubes 15 have characteristics that could sustain a more aggressive cleaning process for better cleaning results, the cleaning process are limited by a few tubes 15 that cannot withstand the more aggressive cleaning process. Thus, using this configuration may require a longer period of time to clean the tubes 15 and/or can result in some of the tubes 15 not being fully cleaned.

Accordingly, as illustrated in FIG. 6, the cleaning system 80 includes a controller 120 that accounts for at least one characteristic of a tube 15 being cleaned. For example, the controller 120 controls the cleaning device 85 to deliver a cleaning fluid using different delivery parameters depending at least in part upon the at least one characteristic of the tube 15 (or tubes) being cleaned. The characteristics of the tube 15 may include, among other things, the material composition of the tube 15, the diameter of the tube 15, the thickness of a wall of the tube 15, the radius of curvature of any bends 40 in the tube 15, or the position of the tube 15 within the heat exchanger 10. The delivery parameters may include, among other things, the amount of blasting media (e.g., the total amount of blasting media delivered to the tube, the flow rate of blasting media, or the ratio of blasting media to the gas or liquid of the cleaning fluid), the pressure of the compressed gas of the cleaning fluid, the velocity of the compressed gas of the cleaning fluid, the velocity of blasting media, the type of blasting media or gas used, or the duration of time a tube 15 is cleaned (e.g., the duration of time that the cleaning fluid is injected into the tube 15).

Figure 12:
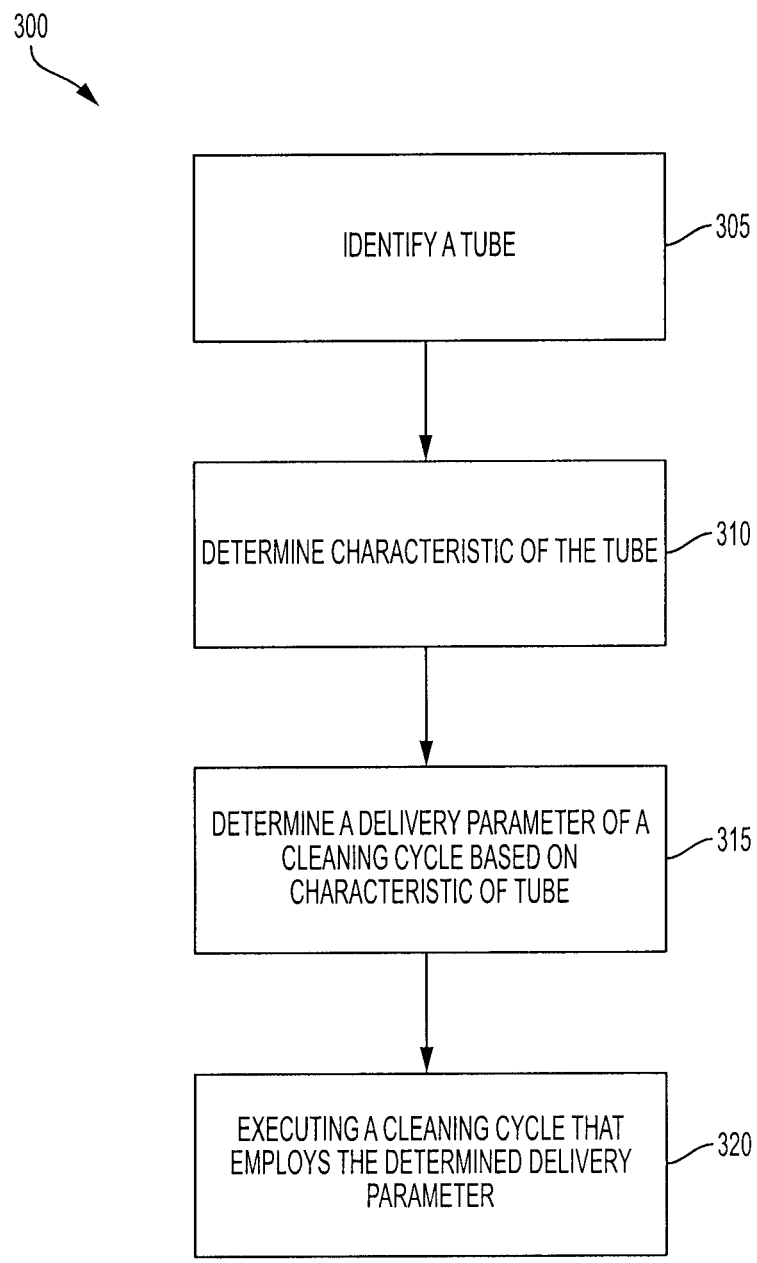
FIG. 12 is a flow chart of a method of cleaning a tube of a heat exchanger according to some embodiments.

FIG. 12 illustrates a method 300 of cleaning the tubes 15 of a heat exchanger 10 according to one embodiment as performed by the controller 120. The method 300 includes determining a tube 15 engaged with a nozzle for receiving a cleaning fluid (at block 305). As previously described, the arm 105 moves the tool head 100 to align one or more nozzles 95 with one or more respective tubes 15. Accordingly, the controller 120 may determine the engaged tube 15 by determining or tracking a position of the tool head 100 within a known configuration of heat exchanger 10. In other words, the controller 120 may access stored data representing a predetermined sequence of movements of the tool head 100 within the heat exchanger 10 and a current position of the tool head 100 within the sequence to identify where the tool head 100 is currently positioned and, consequently, what tube(s) 15 are engaged with the nozzle(s) 95. Similarly, the controller 120 may access stored data representing a current position of the tool head 100 (initially defaulting to a starting position in some embodiments), that is updated after each movement of the tool head 100. The controller 120 may compare this positional information of the tool head 100 with stored data representing positions of the tubes 15 within the heat exchanger 10 to identify what tube(s) 15 are engaged with the nozzle(s) 95. Alternatively or in addition, in some embodiments one or more sensors may be used to align a nozzle 95 with the end of a tube 15, which may also be used to identify the particular tube 15 engaged with the nozzle 95, the position of the tool head 100 or both. Such sensors may include any type of sensing or measuring devices including, but not limited to, cameras, location sensors, speed sensors, RFID tags, laser sensors, ultrasonic sensors, pressure sensors, strain gauges, and the like.

Once the tube 15 being cleaned is determined, the illustrated method 300 includes determining a characteristic of the tube 15 (at block 310). As previously discussed, characteristics of the tube 15 may include, among other things, the material composition of the tube 15, the diameter of the tube 15, the thickness of a wall of the tube 15, the radius of curvature of any bends 40 in the tube 15, or the position of the tube 15 within the heat exchanger 10. In some embodiments, the controller 120 may access stored data 115 (see FIG. 13, described in greater detail below), such as a database, look-up table, and the like, to determine a characteristic of a tube 15. For example, after determining the tube 15 engaged with the nozzle 95, the controller 120 may use a look-up table to identify one or more characteristics of the determined tube 15. Alternatively or in addition, the controller 120 may use data from one or more sensors 110 to determine a characteristic of a tube 15.

The method 300 further includes determining a delivery parameter of a cleaning cycle based on the characteristic of the tube 15 (at block 315). Depending on the characteristic of the tube 15 engaged with a nozzle 95, the cleaning system 80 employs an appropriately tailored cleaning cycle. For example, the controller 120 may access stored data (a look-up table, function, graph, and the like) that maps particular tube characteristics to particular delivery parameters for a cleaning cycle. As noted above, the delivery parameters may include, among other things, the amount of blasting media (e.g., the total amount of blasting media delivered to the tube, the flow rate of blasting media, or the ratio of blasting media to the gas or liquid of the cleaning fluid), the pressure of the compressed gas of the cleaning fluid, the velocity of the compressed gas of the cleaning fluid, the velocity of blasting media, the type of blasting media or gas used, or the duration of time a tube 15 is cleaned (e.g., the duration of time that the cleaning fluid is injected into the tube 15). Thus, after determining a tube characteristic for the tube 15 engaged with the nozzle 95, the controller 120 may access the stored data to determine the delivery parameter. In some embodiments, the controller 120 determines a delivery parameter, such as a pressure level, amount of blasting media, and the like. Alternatively or in addition, the controller 120 determines an adjustment to a default delivery parameter, such as a reduction in pressure, an increase in pressure, and the like. For example, when the characteristics of the tube 15 indicate that the tube 15 is more susceptible to damage, the aggressiveness of the delivery parameters of the cleaning cycle may be reduced as compared to a default cycle or cycles for other types of tubes. Similarly, when the characteristics of the tube 15 are more resistant to damage, the aggressiveness of the delivery parameters of the cleaning cycle may be increased.

As noted above, adjusting the delivery parameters to a more aggressive cleaning cycle may include, for example, increasing the pressure of the compressed gas, increasing the amount of blasting media flowing through the tube 15, or increasing the velocity of the cleaning fluid. Adjusting the delivery parameters to a less aggressive cleaning cycle may include, for example, using a less abrasive blasting media, reducing the amount of time the cleaning cycle runs, or reducing the pressure of the compressed gas. It should be understood that, in some embodiments, the delivery parameter associated with each nozzle 95 can be independently adjustable such that each tube 15 engaged with the tool head 100 may receive a customized cleaning cycle as just described. However, in other embodiments, a common cleaning cycle may be performed for all tubes 15 engaged with the tool head 100, such as a common cleaning cycle that is tailored to the most susceptible tube of the set of tubes being simultaneously cleaned.

With continued reference to FIG. 12, after the delivery parameters are determined, the method 300 includes performing a cleaning cycle using the determined delivery parameters (at block 320). In particular, the cleaning device 85 may adjust, based on signals received from the controller 120, the delivery of the cleaning fluid based on the delivery parameters. For example, when the delivery parameters specify a reduced pressure of the gas (from a previous or default pressure), the cleaning device 85 controls the compressor and/or the valve through which the gas to the nozzle 95 is delivered, to limit the pressure of the gas to the specified level. In some embodiments, the cleaning device 85 includes one or more sensors 110 that detect current delivery parameters, which the cleaning device 85, the controller 120, or both may use as feedback to accurately control the flow of cleaning fluid through the tubes 15.

After the cleaning cycle is complete, the method 300 may be repeated with another tube 15 (or set of tubes). For example, a second tube 15 (or second set of tubes) may be identified as the arm 105, and the second arm move their respective tool head 100 and second tool head to align the nozzles 95 and the second set of nozzles with a new set of tubes 15 (at block 305). One or more characteristics of the second tube 15 is determined (at block 310), and a delivery parameter is determined based on the characteristic of the second tube 15, which may be the same or different from the delivery parameter determined for the previous tube 15 or set of tubes 15 (at block 315). A second cleaning cycle is then executed according to the determined delivery parameters (at block 320). Again, as noted above, the method 300 may be repeated until a cleaning cycle has been performed for the desired tubes 15.

Figure 13:
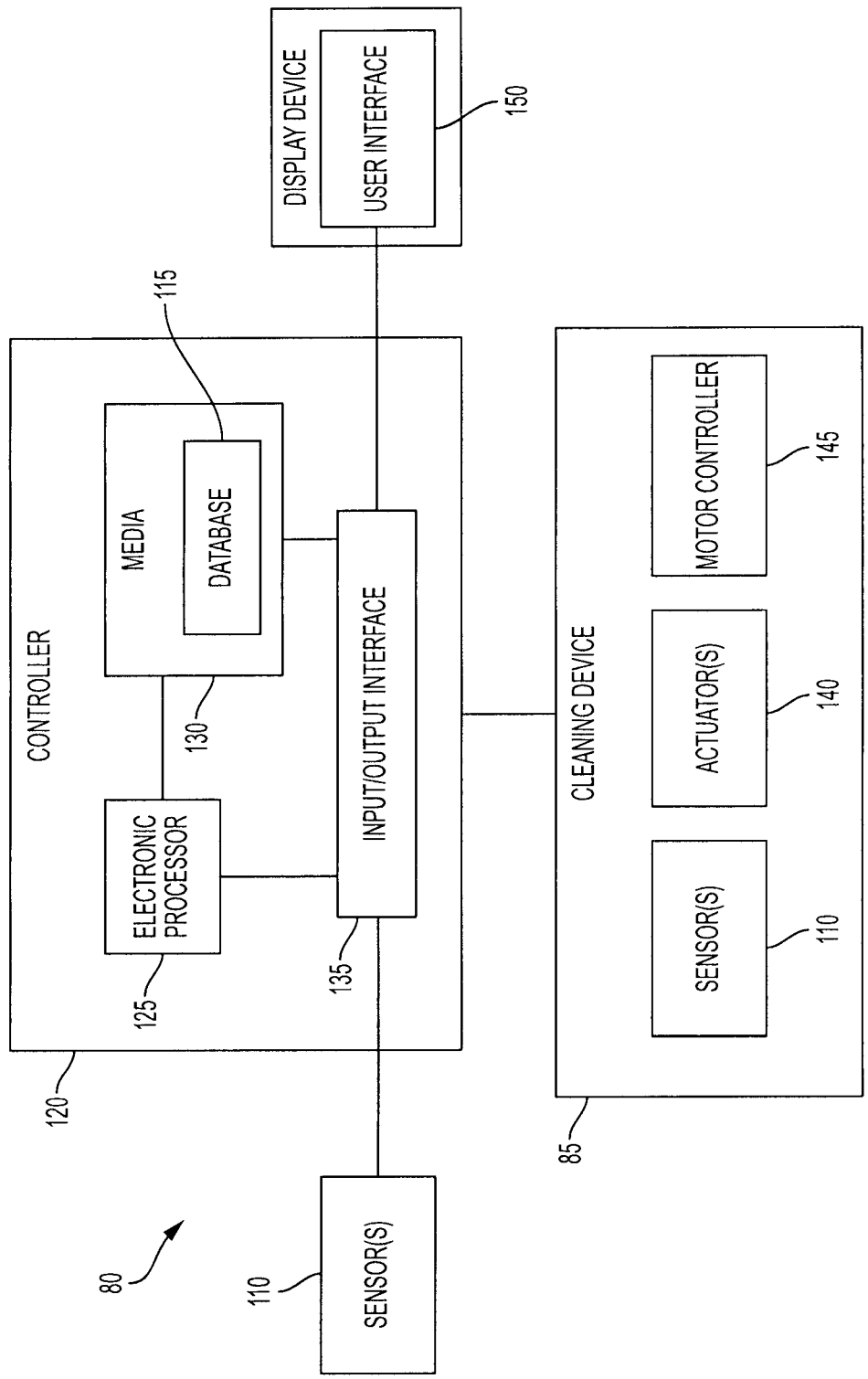
FIG. 13 is a schematic diagram of a controller according to some embodiments.

FIG. 13 schematically illustrates the controller 120 according to some embodiments. The controller 120 communicates (directly or through one or more intermediary devices) with the cleaning device 85 over a wired or wireless connection or network. Also, it should be understood that in some embodiments, the controller 120 is combined or included with the cleaning device 85. As illustrated in FIG. 13, the controller 120 includes an electronic processor 125 (such as a microprocessor, programmable logic controller, application specific integrated circuit, or the like), a non-transitory computer-readable medium 130, and an input/output interface 135. The electronic processor 125, the computer-readable medium 130, and the input/output interface 135 are connected by and communicate through one or more communication lines or buses. It should be understood that in other constructions, the controller 120 includes additional, fewer, or different components. Also, it should be understood that controller 120 as described herein may perform additional functionality than the functionality described herein. Also, the functionality of the controller 120 may be distributed among more than one controller 120.

In the illustrated embodiment, the computer-readable medium 130 stores program instructions and data. For example, the computer-readable medium 130 may store data (structured as databases, look-up tables, and the like) representing a configuration of the tubes 15, a movement or sequence of movements of the tool head 100, characteristics of the tubes 15, delivery parameters, or any combination thereof. The electronic processor 125 is configured to retrieve instructions from the computer-readable medium 130 and execute, among other things, the instructions to perform the methods described herein. The input/output interface 135 communicates with systems, networks, and devices located remote from the controller 120 (for example, over one or more wired or wireless connections). For example, the input/output interface 135 may include one or more ports for receiving cables or other wired connections (including network cables and peripheral device cables, one or more transceivers for receiving wireless communications, or a combination thereof). The input/output interface 135 may also provide received data to the electronic processor 125 and, in some embodiments, may store received data to the computer-readable medium 130.

As also illustrated in FIG. 13, the controller 120 communicates with the cleaning device 85. For example, the controller 120 may communicate with one or more actuators 140 of the cleaning device 85. The actuators 140 may control the compressor to achieve a desired pressure of compressed gas. In addition, the actuators 140 may include one or more motors moving the arm 105. Similarly, the actuators 140 may control the flow rate of the cleaning fluid flowing through the nozzles 95, or the ratio of blasting media within the cleaning fluid, such as by opening, closing, or modulating the flow rate through one or more valves supplying cleaning fluid to the tool head 100 and nozzles 95. It should be understood that, in some embodiments, the controller 120 communicates with the actuators 140 directly and, in other embodiments, the controller 120 communicates with one or more of the actuators 140 through an actuator controller 120 included in the cleaning device 85, such as a motor controller 145. With continued reference to FIG. 13, the controller 120 may be configured to communicate with sensors 110 included in the cleaning device 85, external sensors 110 positioned on the heat exchanger 10 or at other locations, or a combination thereof.

Figure 14:
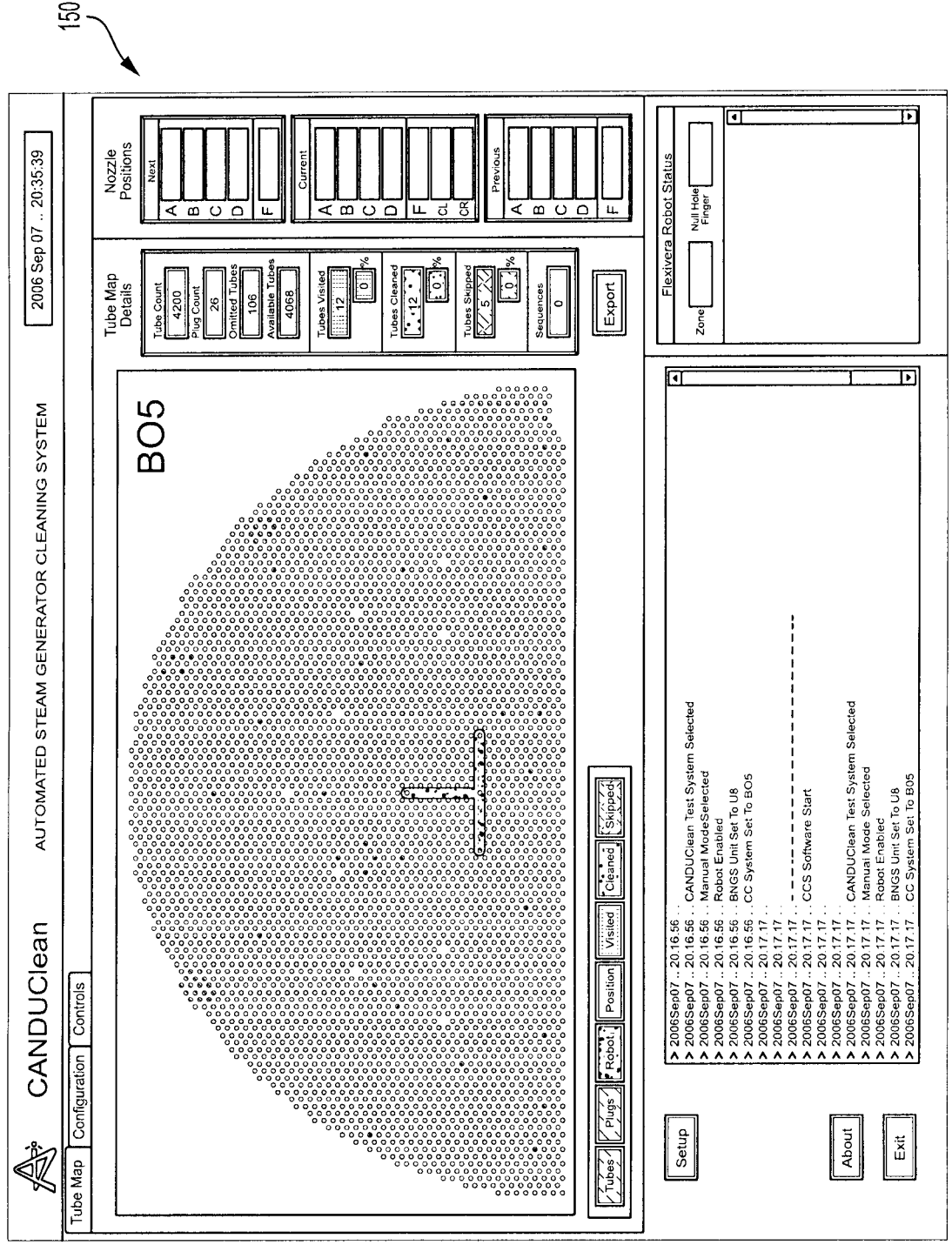
FIG. 14 illustrates a user interface for the controller of FIG. 13.

In addition, in some embodiments, the controller 120 generates a user interface 150 displayed through a display device included in the controller 120 or external to the controller 120 (for example, through the input/output interface 135). The user interface 150 allows an operator to configure the cleaning system 80. For example, an operator may be able to use the user interface to initiate an automated cleaning method as described above, set any of the delivery parameters for each tube, sets of tubes, or all desired tubes of the heat exchanger 10, define tube configurations, instruct movement of the tool head 100, and the like. In addition, in some embodiments the user interface 150 displays information about the cleaning device 85, the cleaning process, or the heat exchanger 10. For example, FIG. 14 provides an example of the user interface 150. As shown, the user interface 150 displays a cross-sectional view of the tubes 15 of the heat exchanger 10, and provides information on the tubes 15, including what tubes 15 have been cleaned, what tubes are currently being cleaned, what tubes 15 cannot be cleaned, and any one or more of the various characteristics of the tubes 15 described herein.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the tool head 100 in the illustrated embodiments utilizes nozzles 95 for delivery of cleaning fluid to the tubes 15 of the heat exchanger 10 as described above, whereas similar nozzles can be located on a second tool head positioned to receive the cleaning fluid and debris from the tubes 15 (as also described above). Although each tool head 100 and second tool head in the illustrated embodiments have multiple nozzles(e.g., 95) for this purpose, it will be appreciated that cleaning fluid can be delivered to the tubes 15 via any number of nozzles 95, and second set of nozzles of the tool head 100 and second tool head. Also, some embodiments do not utilize any identifiable nozzles 95 for delivery of cleaning fluid to the tubes 15 and/or do not utilize any identifiable nozzles for receipt of cleaning fluid from the tubes 15. The cleaning systems and methods in such embodiments instead rely upon other manners of fluid delivery and/or receipt, including without limitation one or more shrouds removably received over respective inlet ends 30 of the tubes 15 and/or over respective outlet ends 35 of the tubes 15 while maintaining a sealed relationship with the tubesheet 60 or with the ends 30, 35 of the tubes 15, a removable plenum that can be placed over two or more inlet ends 30 of the tubes 15 and/or over two or more outlet ends 35 of the tubes 15 while maintaining a sealed relationship with the tubesheet 60, or even pressurizing the inlet side of the hollow bottom portion 45 of the heat exchanger 10 (e.g., between the heat exchanger wall 50 and the tubesheet 60) and/or evacuating the outlet side of the hollow bottom portion 45 to permit free-flow of cleaning fluid into and through the inlet side of the hollow bottom portion 45, the tubes 15, and the outlet side of the hollow bottom portion 45. Still other manners of delivery and receipt of cleaning fluid within the heat exchanger 10 are possible, and fall within the spirit and scope of the present invention.

Embodiments of the present disclosure include a cleaning system for cleaning inner surfaces of tubes included in a heat exchanger, the cleaning system comprising a cleaning device having a port through which cleaning fluid is injected into a first tube to perform a first cleaning cycle, and through which cleaning fluid is injected into a second tube to perform a second cleaning cycle; and a controller configured to determine a first delivery parameter for the first cleaning cycle based at least in part on at least one characteristic of the first tube, control the cleaning device to perform the first cleaning cycle based at least in part on the first delivery parameter, determine a second delivery parameter for the second cleaning cycle based at least in part on at least one characteristic of the second tube, the second delivery parameter being different than the first delivery parameter, and control the cleaning device to perform the second cleaning cycle based at least in part on the second delivery parameter. In such cleaning systems, the cleaning fluid can include pressurized gas and blasting media. Also in such cleaning systems, the at least one characteristic of the first tube can include at least one selected from a group consisting of a material composition of the first tube, a diameter of the first tube, a thickness of a wall of the first tube, a radius of curvature of a bend in the first tube, and a position of the tube within the heat exchanger. Also in such cleaning systems, the first delivery parameter can include at least one selected from a group consisting of an amount of blasting media, a pressure of compressed gas, a velocity of compressed gas, a velocity of blasting media, a type of blasting media, a type of compressed gas, and a duration of time the cleaning fluid is injected into the first tube. Also in such cleaning systems, the cleaning device can include a compressor configured to pressurize the cleaning fluid, and at least one valve configured to control flow of the cleaning fluid to the first and second tubes, and wherein the controller is configured to control the cleaning device to perform the first cleaning cycle by controlling at least one of the compressor and the at least one valve.

Some embodiments of the present disclosure include a method of cleaning a heat exchanger, the method comprising determining, with a controller, a tube in the heat exchanger in fluid communication with a nozzle of a cleaning device for injecting a cleaning fluid into the tube during a cleaning cycle; determining, with the controller, a characteristic of the tube; determining, with the controller, a delivery parameter of the cleaning cycle for the tube based at least in part on the characteristic of the tube; and performing the cleaning cycle for the tube based at least in part on the delivery parameter. In such methods, the cleaning cycle can include injecting cleaning fluid into the tube of the heat exchanger, the cleaning fluid including compressed gas and blasting material. Also in such methods, determining a characteristic of the tube can include determining at least one selected from a group consisting of a material composition of the tube, a diameter of the tube, a thickness of the wall of the tube, a radius of curvature of a bend in the tube, and a position of the tube within the heat exchanger. Also in such methods, determining a delivery parameter of a cleaning cycle can include determining at least one selected from a group consisting of an amount of blasting media, a pressure of compressed gas, a velocity of compressed gas, a velocity of blasting media, a type of blasting media, a type of gas, and a duration of time the cleaning fluid is injected into the tube.

In some embodiments of the present disclosure, a system for cleaning inner surfaces of a plurality of tubes included in a heat exchanger is provided, and comprises a motorized tool movable along at least one dimension of a tubesheet, the tubesheet containing an end of each of the plurality of tubes, and the motorized tool injecting a cleaning fluid into each of the plurality of tubes; and a controller configured to automatically set one or more of a pressure of the cleaning fluid, a velocity of the cleaning fluid, a flow rate of the cleaning fluid, a type of cleaning fluid, and a duration of cleaning fluid delivery to a tube of the plurality of tubes based at least in part upon a current position of the motorized tool with respect to the tubesheet or with respect to the plurality of tubes. In such systems, the cleaning fluid can comprise gas and blasting media, wherein setting the pressure of the cleaning fluid comprises setting the pressure of the gas of the cleaning fluid. Also in such systems, the cleaning fluid can comprise gas and blasting media, wherein setting the velocity of the cleaning fluid comprises setting the velocity of the gas of the cleaning fluid. Also in such systems, the cleaning fluid can comprise gas and blasting media, wherein setting the pressure of the cleaning fluid comprises setting the flow rate of at least one of the gas and the blasting media of the cleaning fluid.

The invention claimed is:

1. A cleaning system for cleaning inner surfaces of tubes included in a heat exchanger, the cleaning system comprising:
a first cleaning device having a first cleaning head configured to supply a cleaning fluid and blasting media through the first cleaning head and into a tube to perform a cleaning cycle;
a second cleaning device having a second cleaning head configured to receive the cleaning fluid and the blasting media through the second cleaning head from the tube in the cleaning cycle;
wherein the first cleaning device, the second cleaning device, and a reclaimer define a first portion of a closed loop flow path for the cleaning fluid and the blasting media, wherein the tube when coupled to the first cleaning device and the second cleaning device defines a second portion of the closed loop flow path, and wherein the reclaimer is configured to collect the cleaning fluid and the blasting media from the second cleaning device, separate debris from the blasting media for disposal, and supply reclaimed blasting media to the first cleaning device without the separated debris; and
a controller configured to:
determine a delivery parameter for the cleaning cycle based at least in part on at least one characteristic of the tube,
control the cleaning device to perform the cleaning cycle based at least in part on the first delivery parameter,
send a signal to the first cleaning device to supply the cleaning fluid and the blasting media into the tube, wherein reclaimed blasting media is concurrently supplied to the first cleaning device using the reclaimer.

2. The cleaning system of claim 1, wherein the cleaning fluid includes pressurized gas.

3. The cleaning system of claim 1, wherein the at least one characteristic of the tube includes at least one selected from a group consisting of a material composition of the tube, a diameter of the tube, a thickness of a wall of the tube, a radius of curvature of a bend in the tube, and a position of the tube within the heat exchanger.

4. The cleaning system of claim 1, wherein the delivery parameter includes at least one selected from a group consisting of an amount of blasting media, a pressure of compressed gas, a velocity of compressed gas, a velocity of blasting media, a type of blasting media, a type of compressed gas, and a duration of time the cleaning fluid is injected into the tube.

5. The cleaning system of claim 1, wherein the cleaning device includes a compressor configured to pressurize the cleaning fluid, and at least one valve configured to control flow of the cleaning fluid to the tube, and wherein the controller is configured to control the cleaning device to perform the cleaning cycle by controlling at least one of the compressor and the at least one valve.

6. The cleaning system of claim 1 wherein the first cleaning head has a nozzle, and wherein the nozzle is configured to supply the cleaning fluid into the tube to perform the cleaning cycle.

7. The cleaning system of claim 1, wherein a fluid-tight seal is established between the first and second cleaning heads and the tube during the cleaning cycle.

8. A method of cleaning a heat exchanger, the method including:
determining, with a controller, a tube in the heat exchanger to be supplied with cleaning fluid and blasting media from a first cleaning head of a first cleaning device during a cleaning cycle;
determining, with the controller, a characteristic of the tube;
determining, with the controller, a delivery parameter of the cleaning cycle for the tube based at least in part on the characteristic of the tube;
performing the cleaning cycle for the tube based at least in part on the delivery parameter;
concurrently supplying the cleaning fluid and the blasting media into the tube using the first cleaning device and supplying reclaimed blasting media to the first cleaning device using a reclaimer;
wherein the cleaning cycle comprises delivering the cleaning fluid and the blasting media from through the first cleaning head of the first cleaning device, through the tube, and through a second cleaning head of a second cleaning device at the opposite end of the tube; and
wherein the first cleaning device, the second cleaning device, and the reclaimer define a first portion of a closed loop flow path for the cleaning fluid and the blasting media, and the tube when coupled to the first cleaning device and the second cleaning device defines a second portion of the closed loop flow path; and
wherein the reclaimer is configured to collect the cleaning fluid and blasting media from the second cleaning device, separate debris from the blasting media for disposal, and supply the reclaimed blasting media to the first cleaning device without the separated debris.

9. The method of claim 8, wherein the cleaning cycle includes injecting cleaning fluid into the tube of the heat exchanger, the cleaning fluid including compressed gas and blasting material.

10. The method of claim 8, wherein determining a characteristic of the tube includes determining at least one selected from a group consisting of a material composition of the tube, a diameter of the tube, a thickness of the wall of the tube, a radius of curvature of a bend in the tube, and a position of the tube within the heat exchanger.

11. The method of claim 8, wherein determining a delivery parameter of a cleaning cycle includes determining at least one selected from a group consisting of an amount of blasting media, a pressure of compressed gas, a velocity of compressed gas, a velocity of blasting media, a type of blasting media, a type of gas, and a duration of time the cleaning fluid is injected into the tube.

12. The method of claim 8, further comprising creating a seal with the first cleaning head to establish sealed fluid communication between the inside of the tube and the first cleaning head before supplying the tube with the cleaning fluid.

13. A system for cleaning inner surfaces of a plurality of tubes included in a heat exchanger, the system comprising:
a first motorized tool movable along at least one dimension of a tubesheet, the tubesheet containing an end of each of the plurality of tubes, and the motorized tool having a first tool head for delivering a cleaning fluid and blasting media into each of the plurality of tubes;
a second motorized tool movable along at least one dimension of a second tubesheet the second tubesheet containing an opposite end of each of the plurality of tubes, and the second motorized tool having a second tool head for receiving the cleaning fluid and the blasting media from each of the plurality of tubes;

wherein the first motorized tool, the second motorized tool form, and a reclaimer define a first portion of a closed loop flow path for the cleaning fluid and the blasting media, wherein each of the plurality of tubes when coupled to the first motorized tool and the second motorized tool defines a second portion of the closed loop flow path, and wherein the reclaimer is configured to collect the cleaning fluid and blasting media from the second motorized tool, separate debris from the blasting media for disposal, and supply reclaimed blasting media to the motorized tool without the separated debris; and a controller configured to automatically set at least one of:
  a pressure of the cleaning fluid and
  a flow rate of at least one of the cleaning fluid and the blasting media based on a current position of the motorized tool with respect to the tubesheet, and wherein the controller is configured to send a signal to the first motorized tool to supply the cleaning fluid and the blasting media into the tube, wherein reclaimed blasting media is concurrently supplied to the first cleaning device using the reclaimer.

14. The system of claim 13, wherein the tool delivers the cleaning fluid and the blasting media to one tube at a time.

15. The system of claim 13, wherein the tool delivers the cleaning fluid and the blasting media to at least two tubes at a time.

16. The system of claim 13, wherein the cleaning fluid includes compressed gas.

17. The system of claim 13, wherein the motorized tool moves along two dimensions of the tubesheet to bring a cleaning head of the motorized tool into registry with at least one of the tubes, and to thereafter establish a fluid-tight sealed relationship between the cleaning head and the tube.

* * * * *